US011188718B2

(12) United States Patent
Breedvelt-Schouten et al.

(10) Patent No.: US 11,188,718 B2
(45) Date of Patent: Nov. 30, 2021

(54) COLLECTIVE EMOTIONAL ENGAGEMENT DETECTION IN GROUP CONVERSATIONS

(71) Applicant: INTERNATIONAL BUSINESS MACHINES CORPORATION, Armonk, NY (US)

(72) Inventors: Ilse M. Breedvelt-Schouten, Manotick (CA); John A. Lyons, Ottawa (CA); Jana H. Jenkins, Raleigh, NC (US); Jeffrey A. Kusnitz, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 16/585,874

(22) Filed: Sep. 27, 2019

(65) Prior Publication Data

US 2021/0097142 A1    Apr. 1, 2021

(51) Int. Cl.
*G06F 40/30* (2020.01)
*H04L 12/18* (2006.01)

(52) U.S. Cl.
CPC .......... *G06F 40/30* (2020.01); *H04L 12/1813* (2013.01)

(58) Field of Classification Search
CPC ..... H04L 12/1813; G10L 15/22; G10L 25/63; G06F 40/20; G06F 40/30
See application file for complete search history.

(56) References Cited

U.S. PATENT DOCUMENTS 4,696,041 A *   9/1987   Sakata ............... G10L 25/87
                                                    704/233
9,304,621 B1 *  4/2016   Wakim ................ G06F 1/1692
(Continued)

FOREIGN PATENT DOCUMENTS

KR    101848415 B1    3/2018
WO    2017112496 A1   6/2017
WO    2017162919 A1   9/2017

OTHER PUBLICATIONS

Gondaliya et al., "An Improved Approach for Online Trending Forum Detection Based on Sentiment Analysis", 2016 International Conference on Inventive Computation Technologies (ICICT), Aug. 26-27, 2016, 5 pages.
Google, "How to save a word document as a pdf on macbook", <https://www.google.com/search?ei=1D4yW4mzNtLU5g KBy4L..>, Accessed Jun. 26, 2018, 2 pages.
(Continued)

*Primary Examiner* — Eric Yen
(74) *Attorney, Agent, or Firm* — Maeve Carpenter; Andrew D. Wright; Roberts Calderon Safran & Cole, P.C.

(57) ABSTRACT

A collective emotional engagement detection arrangement is provided for determining emotions of users in group conversations. A computer-implemented method includes determining a first conversation velocity of communications through conversation channels over a first time period for a group discussion between user computers; determining that a conversation velocity of the communications has increased to a second conversation velocity of communications which exceeds a predetermined threshold, and has remained above the predetermined threshold for at least a second time period; determining, aggregated emotions of the users during the second time period; and providing an output to a moderator of the group discussion indicating that the second conversation velocity of the communications has exceeded the predetermined threshold for at least the second time period, and indicating the aggregated emotions of the users during the second time period.

20 Claims, 6 Drawing Sheets

(56) References Cited

U.S. PATENT DOCUMENTS

| | | | |
|---|---|---|---|
| 10,061,977 B1* | 8/2018 | Chang | G06K 9/00335 |
| 2007/0005754 A1* | 1/2007 | Horvitz | H04L 67/22 |
| | | | 709/224 |
| 2007/0259668 A1* | 11/2007 | Legg | H04L 5/14 |
| | | | 455/450 |
| 2011/0196677 A1* | 8/2011 | Deshmukh | G10L 15/22 |
| | | | 704/246 |
| 2011/0295392 A1* | 12/2011 | Cunnington | H04N 7/15 |
| | | | 700/90 |
| 2012/0209919 A1* | 8/2012 | Shah | G06Q 30/0251 |
| | | | 709/205 |
| 2012/0290950 A1* | 11/2012 | Rapaport | H04N 21/8358 |
| | | | 715/753 |
| 2013/0019187 A1* | 1/2013 | Hind | H04L 65/4023 |
| | | | 715/753 |
| 2013/0337421 A1 | 12/2013 | Gerken, III | |
| 2014/0140497 A1* | 5/2014 | Ripa | H04M 3/5133 |
| | | | 379/265.06 |
| 2014/0188457 A1* | 7/2014 | Fink | G06F 40/30 |
| | | | 704/9 |
| 2014/0236953 A1 | 8/2014 | Rapaport et al. | |
| 2014/0297765 A1* | 10/2014 | Beckley | H04L 43/08 |
| | | | 709/206 |
| 2016/0183868 A1* | 6/2016 | Rot | A61B 5/4803 |
| | | | 434/185 |
| 2017/0221336 A1* | 8/2017 | Ogaz | G08B 21/0423 |
| 2018/0032610 A1* | 2/2018 | Cameron | G06F 40/284 |
| 2018/0068012 A1* | 3/2018 | O'Connor | G06F 16/5854 |
| 2018/0124243 A1* | 5/2018 | Zimmerman | H04M 3/5175 |
| 2019/0147367 A1* | 5/2019 | Bellamy | G06N 20/00 |
| | | | 706/12 |
| 2019/0333514 A1* | 10/2019 | Xu | G10L 25/63 |
| 2020/0065417 A1 | 2/2020 | Anders et al. | |
| 2020/0226217 A1 | 7/2020 | Anders et al. | |
| 2020/0233915 A1 | 7/2020 | Anders et al. | |
| 2021/0029065 A1* | 1/2021 | Erhart | H04L 51/02 |

OTHER PUBLICATIONS

Anonymous, "Content Moderator", <https://azure.microsoft.com/en-us/services/cognitive-services/content-moderator/>, Microsoft Azure, Accessed Sep. 18, 2019, 9 pages.

Anonymous, "Gaius Cicereius", <https://gaiusbot.me/>, Accessed Sep. 18, 2019, 3 pages.

Yam, "Emotion Detection and Recognition from Text Using Deep Learning", <https://www.microfost.com/developerblog/2015/11/29/emotion-detection-and-recognition-from-text-using-deep-learning/>, Accessed Nov. 29, 2015, 10 pages.

Anonymous, "RiteKit API", <https://ritekit.docs.apiary.io/#reference/0/emojis/auto-emojify>, Accessed Sep. 18, 2019, 1 page.

Anonymous, "Emotion analysis in live chat sessions", ip.com, IP.com No. IPCOM000243071D, Sep. 11, 2015, 4 pages.

Mell et al., "The NIST Definition of Cloud Computing", NIST, Special Publication 800-145, Sep. 2011, 7 pages.

* cited by examiner

COLLECTIVE EMOTIONAL ENGAGEMENT DETECTION IN GROUP CONVERSATIONS

BACKGROUND

Aspects of the present invention generally relate to detecting collective emotional engagement of a plurality of users in a group conversation, and, more particularly, to detecting collective emotions of the users during a period when conversation velocity of communications in the group conversation exceeds a threshold.

Many group conversations conducted via computers and servers, such as forums, chat rooms, and discussion groups, have moderators (humans or automated bots) who attempt to keep conversations normal and controlled. As such, moderators monitor the conversations, react to users' complaints, look at actual conversation texts, and make judgments as to whether a group conversation participant needs to be warned or even removed. Moderators are often responsible for monitoring multiple group conversations covering different topics at the same time.

SUMMARY

In a first aspect of the invention, there is a method comprising: determining, by a computer device, a first conversation velocity of communications through conversation channels over a first period of time for a group discussion between a plurality of users utilizing, respectively, a plurality of user computers; determining, by the computer device, that a conversation velocity of the communications has increased to a second conversation velocity of communications which exceeds a predetermined threshold, and has remained above the predetermined threshold for at least a second period of time; determining, by the computer device, aggregated emotions of the users during the second period of time; and providing, by the computer device, an output to a moderator of the group discussion indicating that the second conversation velocity of the communications has exceeded the predetermined threshold for at least the second period of time, and indicating the aggregated emotions of the users during the second period of time.

In another aspect of the invention, there is system for collective emotional engagement detection in a group conversation, the computer-implemented process comprising: a processor, a computer readable memory, and a computer readable storage medium located in a computer device; program instructions to, in response to receiving as inputs a conversation channel, including communications between participants in conversation using user computers, identify a trajectory of measured average conversation velocity as a normal conversation velocity over a first time period; program instructions to identify emotions associated with participants in conversation over the first time period; program instructions to summarize the emotions identified during the first time period into aggregated emotions of the users during the first time period; program instructions to review an ongoing conversation received from the conversation channel during a second time period, after the normal conversation velocity has been established over the first time period; program instructions to, in response to a determination a trajectory of conversation velocity in the second time period exceeding a predetermined threshold, summarize associated emotions of the participants into aggregated emotions of the participants during the second time period; and program instructions to generate an output of the group conversation for use in moderation, comprising identifying a point of increase in the trajectory of the conversation velocity and a summary of the associated emotions during the second time period, wherein the program instructions are stored on the computer readable storage medium for execution by the processor via the computer readable memory.

In another aspect of the invention, there is computer program product, comprising a computer readable storage medium having program instructions embodied therewith, the program instructions executable by computer device to cause the computer device to: determine a first conversation velocity of communications through conversation channels over a first period of time for a group discussion between a plurality of users utilizing, respectively, a plurality of user computers; determine that a conversation velocity of the communications has increased to a second conversation velocity of communications which exceeds a predetermined threshold, and has remained above the predetermined threshold for at least a second period of time; determine aggregated emotions of the users during the second period of time; and provide an output to a moderator of the group discussion indicating that the second conversation velocity of the communications has exceeded the predetermined threshold for at least the second period of time, and indicating the aggregated emotions of the users during the second period of time, wherein the output indicates when the increase of the conversation velocity of the communications start, and indicates the identity of one of the users that sent the communication that started the increase of the conversation velocity.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
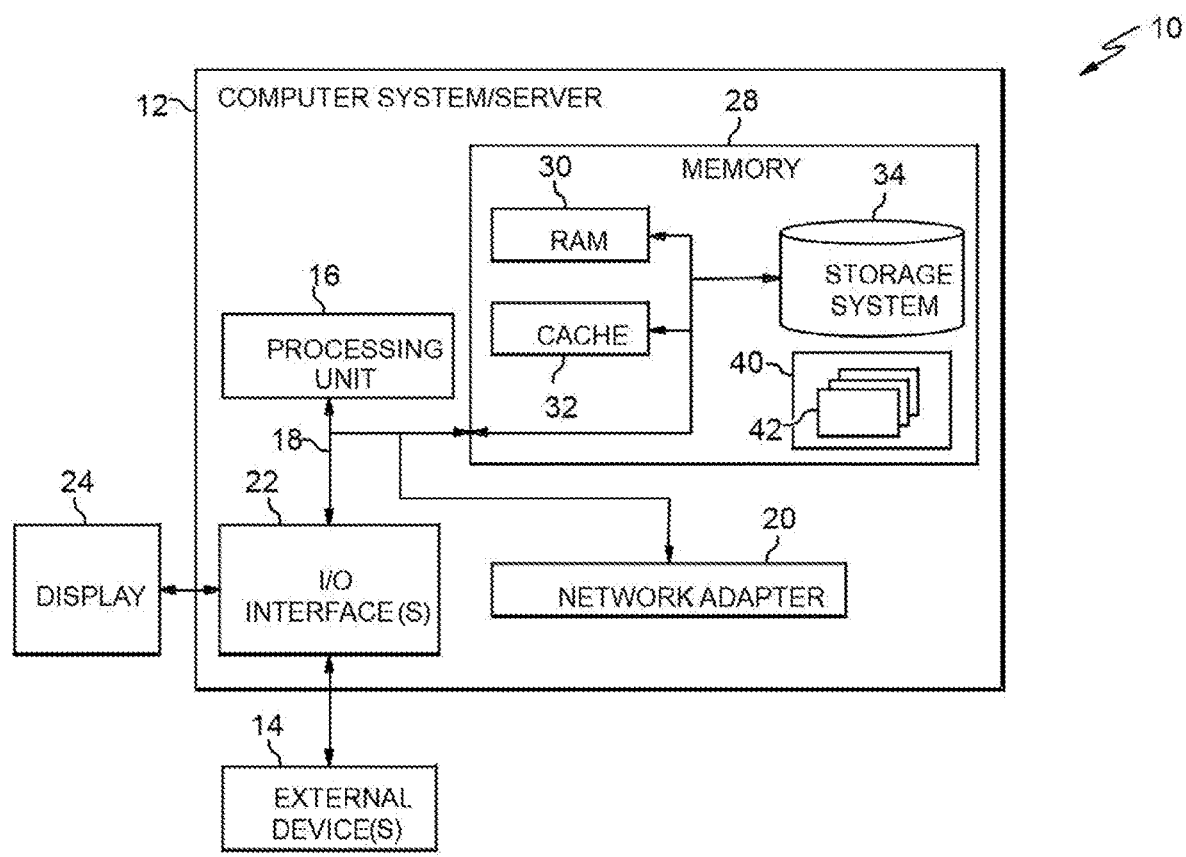
FIG. 1 depicts a cloud computing node according to an embodiment of the present invention.

Aspects of the present invention generally relate to detecting collective emotional engagement of a plurality of users in a group conversation, and, more particularly, to detecting collective emotions of the users during a period when conversation velocity of communications such as posts in the group conversation exceeds a threshold, to provide an output to a moderator of the group conversation to assist in monitoring emotional states of the users to determine if action by the moderator is necessary. The conversation velocity of communications is the number of communications over a given time period, for example, the number of posts per minute in a chat room. The emotions being monitored can be either positive or negative. In other words, the output to the moderator can indicate both times when the participants are becoming upset, or when they are excited in a positive manner.

Moderators are often subject to time constraints since they are frequently responsible for monitoring multiple group conversations covering different topics at the same time. Identifying positive participants and encouraging their collaboration is also a responsibility of moderators, but there is often insufficient time, given that many group conversations, such as chat rooms and forums, are ongoing on a continuous basis. As such, there is a need to support the moderator in identifying issues and opportunities while managing the group conversations.

Many group conversations, such as chat forums, crowdsource the moderation activity by allowing users to up-vote or down-vote posts. Such systems will move posts to the top as they get more up-votes and move them down or perhaps even hide them if they get too many down-votes. These systems require users to make the conscious effort to vote on a post and to work with a limited data set. These systems can also be gamed by bots, which can be programmed to up-vote selective posts.

In accordance with aspects of the invention, emotionally laden parts (both negative and positive) of discussions in group conversations are identified by identifying accelerated reaction speed after a specific message or set of interactions, and by identifying the involved aggregated group emotions within the high-speed interaction period, to provide a moderator with notifications and other information about the state and history of different chat channels. Advantages of this include providing an overview of aggregated/collective emotions over time, warning of areas that might need moderation (human/machine), and providing support to moderators in monitoring the emotional state of multiple group conversations at a time.

Advantageously, embodiments of the present invention provide technical solutions to the problem of providing support to a moderator who is attempting to moderate multiple group discussions on a continuous ongoing basis by using an analysis of an increase in speed of posting/messaging in group discussions between a plurality of computer devices, while simultaneously monitoring the collective, or aggregated, emotional engagement of participants in the group discussion to allow the moderator to take appropriate steps, for example, during emotionally laden discussions. In implementations, the methods and systems perform unconventional operations of analyzing trajectories of conversation velocity in conversation channels used for group conversations between a plurality of user computers to determine if the conversation velocity, determined, for example, by the number of posts in the group conversation, exceeds a predetermined threshold, while, concurrently, determining emotions associated with participants in the group conversation, tagging and labeling the emotions identified, summarizing the emotions identified within predetermined chunks of time, and generating an output of the group conversation to a moderator based on a detected point of increase in the trajectory of the conversation velocity and a summary of the emotions associated with this increased conversation velocity.

Aspects of the invention are implemented using devices and techniques that are necessarily rooted in computer technology. These include systems to monitor and store the conversation velocity of communications taking place in conversation channels between user computers to determine changes in the conversation velocity, computer display techniques, and methods and systems to determine user emotions. These systems to determine user emotions include, but are not limited to, cognitive analysis systems for analyzing text content, monitoring of computer-generated emojis and memojis, facial expression recognition systems, monitoring of physical data from users, such as heart rate and pupil dilation, and systems monitoring movement rates of computer peripheral devices, such as movement of a mouse or typing speed on a computer keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
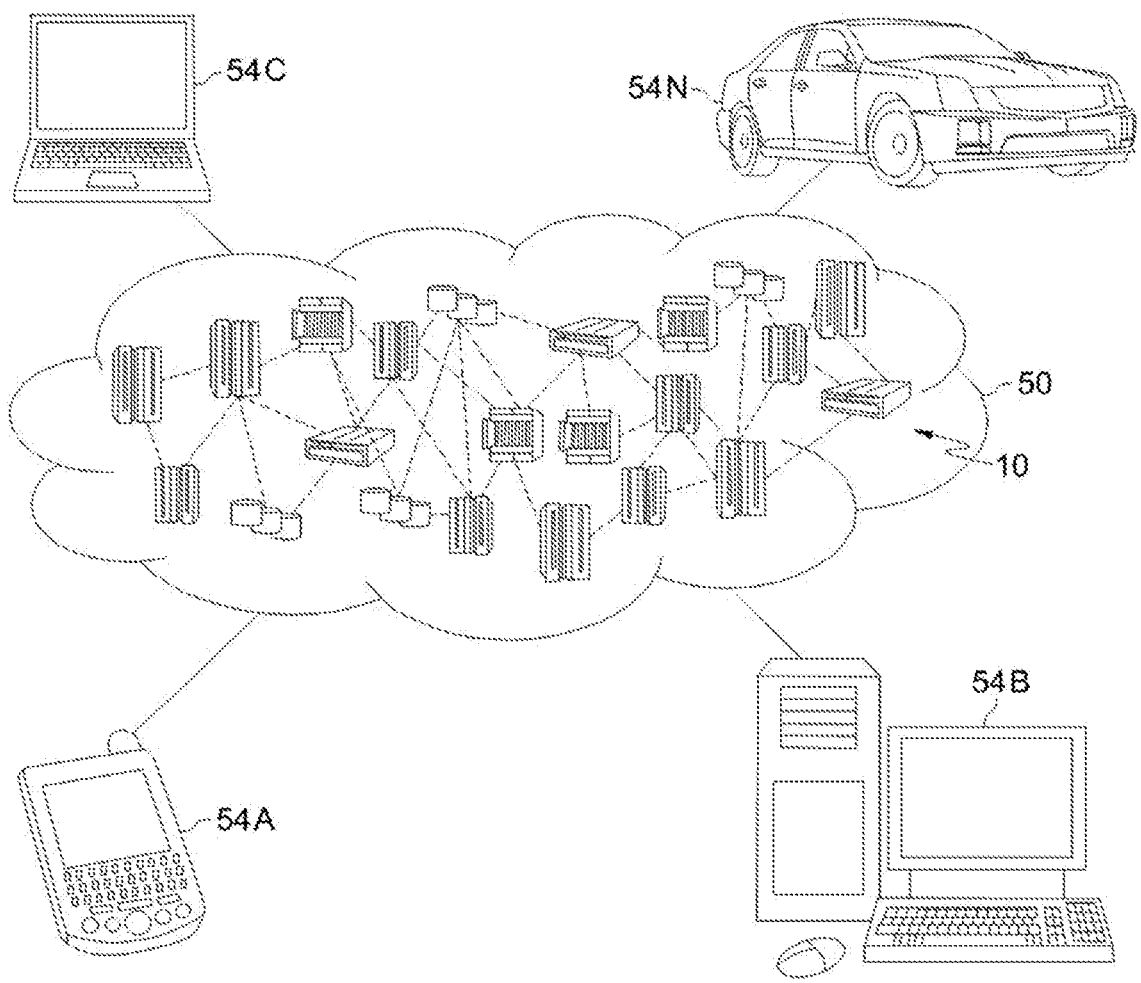
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
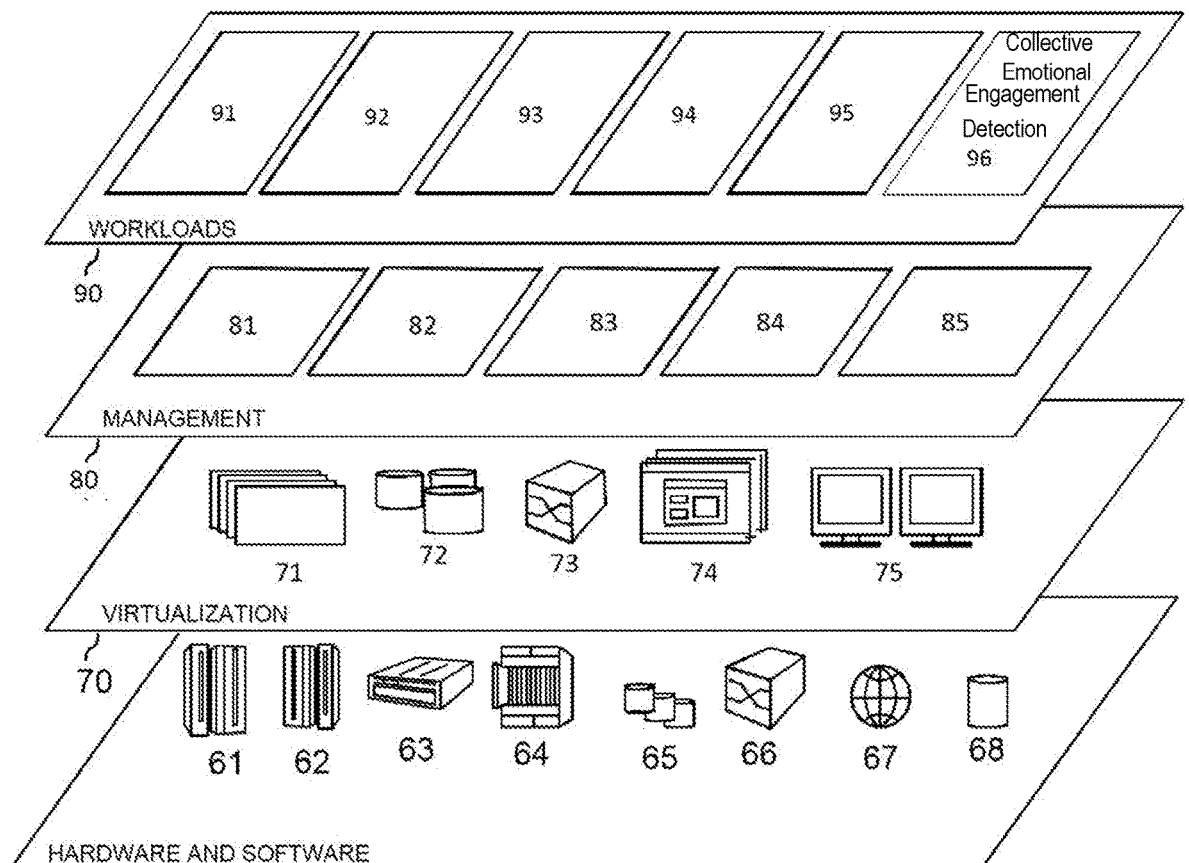
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collective emotional engagement detection 96.

Figure 4:
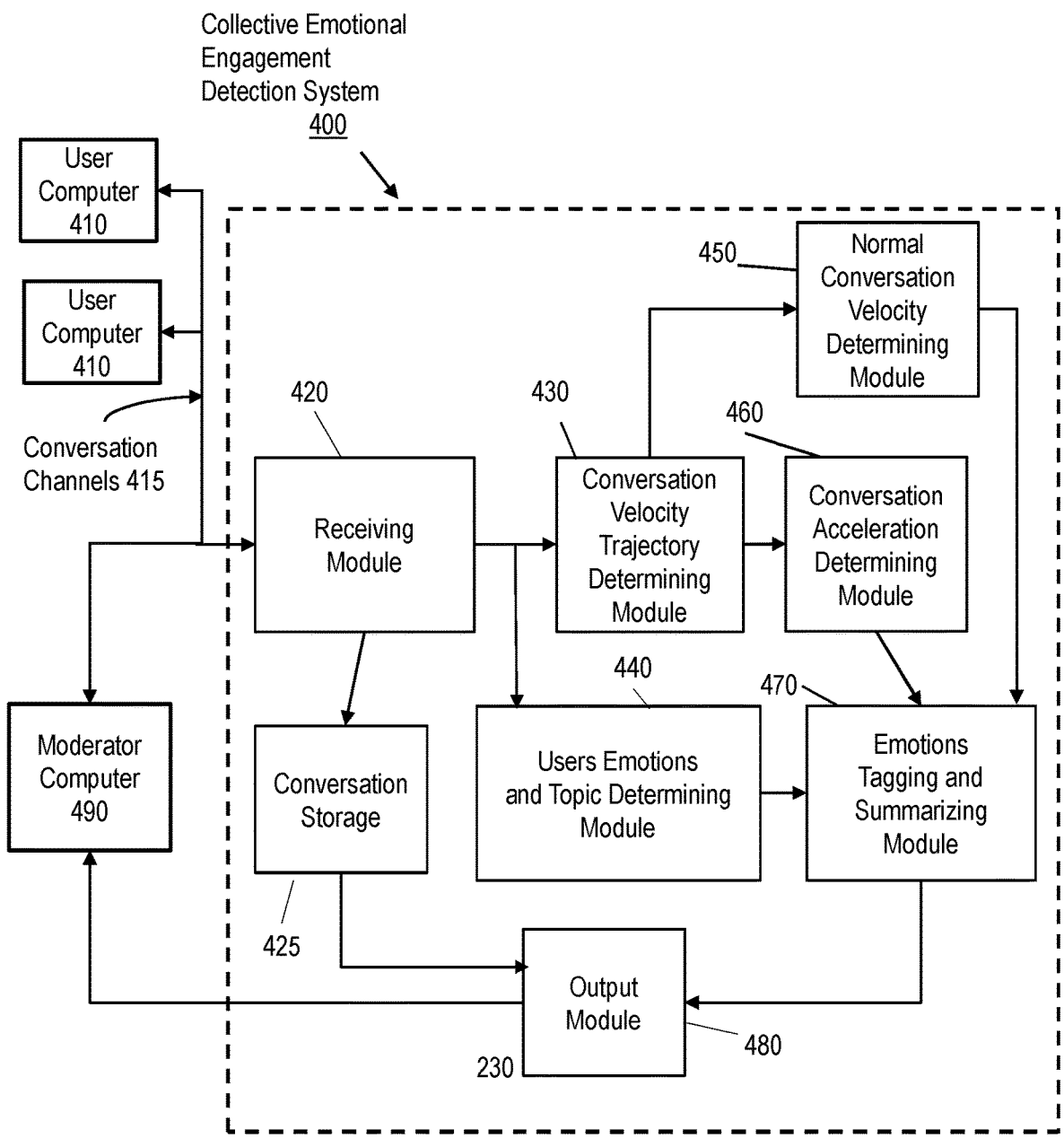
FIG. 4 shows a block diagram of an exemplary environment in accordance with aspects of the invention.

FIG. 4 shows a block diagram of an exemplary environment in accordance with aspects of the invention. In embodiments the environment includes collective emotional engagement detection system 400 that is configured to detect collective emotional engagement of a plurality of users, utilizing user computers 410, during group conversations. In embodiments, the collective emotional engagement detection system 400 includes one or more components of computer system/server 12 of FIG. 1, including a memory 28 which stores information regarding past and current conversations along conversation channels 415 between the respective users, the processing unit 16 and the I/O interfaces 22. In embodiments, one conversation channel 415 is provided per group conversation. In alternative embodiments, a plurality of conversation channels 415 are provided for a single group conversation. Also, in embodiments, the collective emotional engagement detection system 400 can be a back-end server connected to the user computers 410 and the moderator computer 490. In alternative embodiments, the collective emotional engagement detection system 400 can be part of the moderator computer 490 or in one of the user computers 410. In embodiments, the collective emotional engagement detection system 400 communicates with the user computers 410 and the moderator computer 490 over one or more networks such as a local area network (LAN), a general wide area network (WAN), and/or a public network (e.g., the Internet) via network adapter 20.

In addition, still referring to FIG. 4, the output module 480 provides the moderator computer 490 with an output of a group discussion between the user computers 410 to advise the moderator computer 490 when the conversation velocity of communications between the user computers 410 along the conversation channels 415 which the moderator is charged with monitoring has exceeded a predetermined threshold. In embodiments, the moderator is a person, or a plurality of persons. In alternative embodiments, the moderator is a bot or a system. The output module 480 also provides the moderator computer 490 with an indication of the aggregated emotions of the users while the conversation velocity of communications between the users is exceeding a predetermined threshold. It is noted that the modules 420, 430, 440, 450, 460, 470 and 480 of the collective emotional engagement detection system 400 shown in FIG. 4 correspond to program modules 42 of FIG. 1.

Referring to FIG. 4, the receiving module 420 receives inputs from the user computers 410 via the conversation channels 415, and provides outputs to the conversation velocity trajectory determining module 430 and the user emotions and topic determining module 440. The conversation velocity trajectory determining module 430 determines a trajectory of the conversation velocity of communications, such as posts, between the user computers through the conversation channels 415. The conversation velocity of communications is the number of communications over a given time period, for example, the number of posts per minute in a chat room. The trajectory of the conversation velocity is a line of how the conversation velocity changes over a given time period, as shown, for example, by the trajectory of conversation velocity of posts 610 shown in FIG. 6, which will be described later herein. In other words, the trajectory of conversation velocity shows whether the conversation velocity of communications increases or decreases over time, or remains the same. In embodiments, the conversation velocity trajectory determining module 430 continuously provides an output to the normal conversation velocity determining module 450 and the conversation acceleration determining module 460 of the trajectory of the conversation velocity of communications taking place on the conversation channels 415.

In embodiments, the receiving module 420 provides the received conversations to the conversation storage 425. The conversation storage module 425 stores the conversations from the conversation channels 415 which have been received by the receiving module 420, timestamps the stored conversations, and provides the stored and time stamped conversations to the output module 480.

The user emotions and topic determining module 440 uses cognitive analysis and/or measured data to determine emotions of the users of the user computers 410 while they are communicating with one another over the conversation channels 415. To accomplish this, the user emotions and topic determining module 440 uses one or more emotional engagement indicators, including: cognitive analysis (e.g., sentiment analysis) of text content; facial expression analysis of facial expressions of the users determined by cameras located at the user computers 410 or based on memojis of the users; cognitive analysis of emojis used by the users in their communications (where the types of emojis used indicate the types of emotions which the users are experiencing); text analytics; physical data of the users such as heart rate and pupil dilation, determined by sensors including smart watches and pupil dilation sensing cameras; detection of movements of peripheral devices utilized by the users at the user computers 410, such as sensors to determine the speed of typing during the communications and the speed of mouse movements during the communications; and voice analysis for group conversations utilizing vocal communication.

In embodiments, the user emotions and topic determining module 440 also uses cognitive analysis, such as text analytics, to determine topics of discussion by the users of the user computers 410 while they are communicating with one another over the conversation channels 415.

The normal conversation velocity determining module 450 monitors the trajectory of conversation velocity of communications provided by the conversation velocity trajectory determining module 430 during a predetermined first period of time in order to determine an averaged conversation velocity of communications among the various users to establish a normal conversation velocity of communications for each conversation channel 415 (i.e., for each group conversation being monitored). Preferably, this first period of time is a relatively lengthy period of time to provide a good average with regard to the normal conversation velocity of communications, for example, at least several days or a week. In alternative embodiments, the normal conversation velocity determining module 450 continuously monitors the conversations occurring in each conversation channel 415 to provide a rolling average as to what the normal conversation velocity is, rather than just what the average conversation velocity was during a startup period of time. In alternative embodiments, the normal conversation velocity determining module 450 intermittently operates to provide updated averages for setting a normal conversation velocity level.

The conversation acceleration determining module 460 also receives the output of the conversation velocity trajectory determining module 430 for communications between the user computers 410 after a normal conversation velocity of communications has been established during the first period of time to determine whether the conversation velocity of communications has increased to a second conversation velocity of communications which exceeds a predetermined threshold of the conversation velocity of communications. In alternative embodiments, the conversation acceleration determining module 460 also determines when the conversation velocity of communications decreases below a lower threshold to indicate a decrease in postings which might be of concern to the moderator (e.g., that participants are losing interest or leaving the chat room).

The emotions tagging and summarizing module 470 receives inputs from the normal conversation velocity determining module 450, the conversation acceleration determining module 460 and the user emotions and topic determining module 440. In a first operation mode, the emotions tagging and summarizing module 470 tags, labels and summarizes the emotions received from the user emotions and topic determining module 440 during the first time period used to determine the normal conversation velocity determined by the normal conversation velocity determining module 450. The emotions tagging and summarizing module 470 also provides the summary of emotions to the output module 480 which, in turn, provides an output to the moderator computer 490 indicating the summarized emotions as the aggregated emotions of the users during a normal conversation velocity occurring during the first time period. In embodiments, the emotions tagging and summarizing module 470 provides the summary of the emotions as the aggregated emotions of the users in real time.

Figure 6:
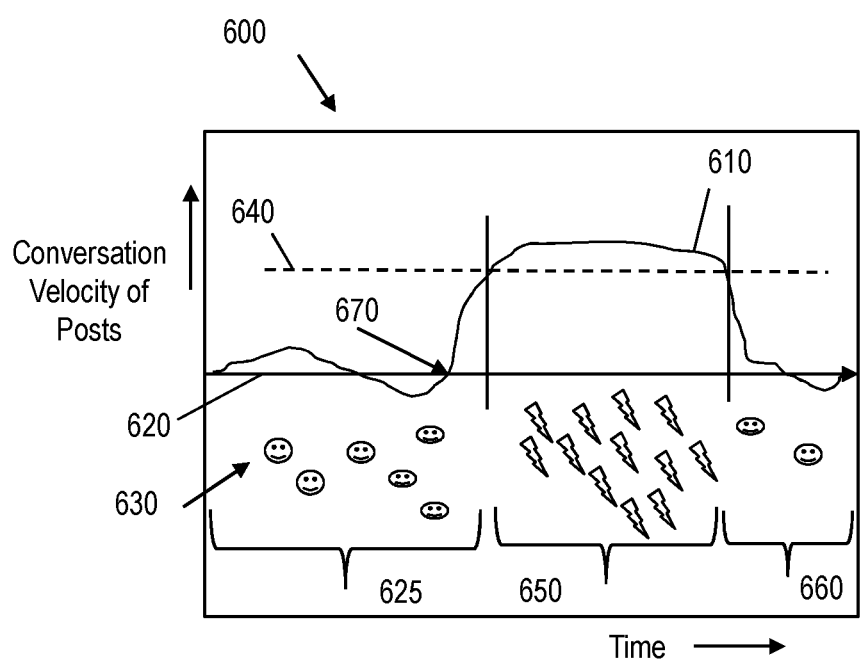
FIG. 6 shows an exemplary embodiment of a display to a moderator in accordance with aspects of the invention.

The emotions tagging and summarizing module 470 also receives outputs from the user emotions and topic determining module 440 during the second time period when the conversation acceleration determining module 460 provides an output indicating an increase in the conversation velocity above a predetermined threshold. The emotions tagging and summarizing module 470 also provides an output to the output module 480 providing a summary of the aggregated user emotions determined by the user emotions and topic determining module 440 during the second time period when the conversation velocity exceeds the predetermined threshold. In embodiments, the emotions tagging and summarizing module 470 provides a summary of the aggregated user emotions in real-time. Output module 480 provides an output to the moderator computer 490 to notify the moderator using, for example, a display such as shown in FIG. 6. In alternative embodiments, the output module 480 also provides third parties having an interest in a group conversation occurring on a conversation channel 415, advertisers, government agencies, software manufacturers, etc. In other alternative embodiments, the output module 480 provides outputs to one or more of the user computers 410.

Figure 5:
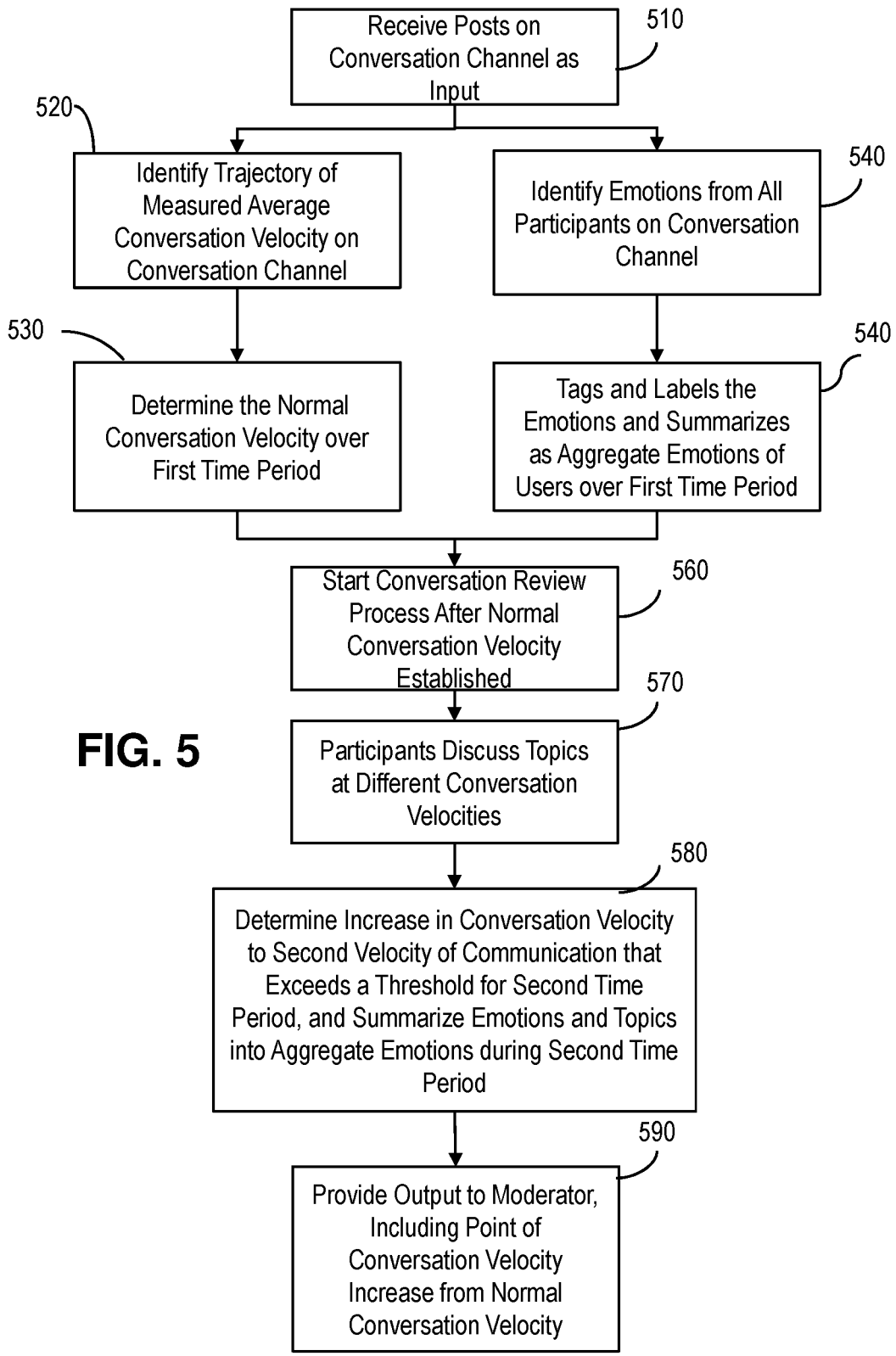
FIG. 5 shows a flowchart of an exemplary method in accordance with aspects of the invention.

FIG. 5 shows a flowchart of an exemplary embodiment for determining collective emotional engagement during a group conversation in accordance with aspects of the invention. The steps of the method of FIG. 5 are performed in the environment of FIG. 4 and are described with reference to the elements and steps described with respect to FIG. 4.

At step 510, the receiving module 420 of the collective emotions engagement detection system 400 receives communications from the conversation channels 415, such as posts, taking place between the user computers 410. In embodiments, the receiving module 420 receives the communications occurring on the conversation channels 415 continuously. In alternative embodiments, the receiving module 420 intermittently samples the communications occurring over the conversation channels 415 for predetermined periods of time. In accordance with alternative aspects of the invention, the receiving module 420 samples the communications occurring over the conversation channels 415 randomly.

At step 520, the receiving module 420 transmits the communications it receives from the conversation channels to the conversation velocity trajectory determining module 430. The conversation velocity trajectory determining module 430 identifies the trajectory of a measured average conversation velocity of the communications over a predetermined time period (e.g., posts per minute) to provide an ongoing average of all communications received from the receiving module 420 pertaining to individual ones of the conversation channels 415 pertaining to group conversations occurring on the individual ones of the conversation channels 415. In other words, for each conversation channel 415, the conversation velocity trajectory determining module 430 determines a trajectory of the measured average conversation velocity occurring on that particular channel 415 pertaining to a group conversation occurring on that channel. In embodiments, the conversation velocity trajectory determining module 430 continuously provides an output of the trajectory of the measured average conversation velocity. In alternative embodiments, the conversation velocity trajectory determining module 430 intermittently provides an output of the trajectory of the measured average conversation velocity, for example, at regularly spaced times, or at random times.

The trajectory of the measured average conversation velocity of the communications over a predetermined time period is a line, such as the trajectory of conversation velocity of posts 610 shown in FIG. 6, discussed hereinafter, which indicates how the conversation velocity (e.g., the number of posts per minute) changes over time. The measured average conversation of the communications on one of the conversation channels 415 is an average of all communications (e.g., posts) taking place on the particular conversation channel 415 from all of user computers 410 engaging in a group discussion on that particular conversation channel 415.

At step 530, the normal conversation velocity determining module 450 receives the trajectory of a measured average conversation velocity of the communications from the conversation velocity trajectory determining module 430, and determines a normal conversation velocity of communications over a first time period. This first time period is selected to be long enough for allowing an accurate determination of normal velocities of communications occurring over each of the monitored conversation channels 415 for the group discussions respectively occurring on the monitored conversation channels 415. In embodiments, the normal conversation velocity determining module 450 uses a first time period which is relatively long, for example, several days or a week, to provide a good estimate of what a normal conversation velocity actually is. Regarding this, the conversation velocity of different participants in a group conversation generally varies greatly, with some participants posting very frequently and other participants posting much less frequently. Also, the conversation velocity changes greatly for different participants depending on the topics under discussion in the group conversation, the time of day, the time of year, geography of the participants, etc. In embodiments, the normal conversation velocity determining module is configured to filter the trajectory of the measured average conversation of the communications received from the conversation velocity trajectory determining module 430 based on, for example, time of day, time of year and geography of the participants.

At step 540, the user emotions and topic determining module 440 receives the same communications passed on by the receiving module 420 from the conversation channels 415 to the conversation velocity trajectory determining module 430, and identifies emotions from all conversation participants, using, for example: cognitive analysis (e.g., sentiment analysis) of text content; facial expression analysis of facial expressions determined by cameras or based on memojis of the users; cognitive analysis of emojis used by the users in their communications (where the types of emojis used indicate the types of emotions which the users are experiencing); text analytics; physical data of the users such as heart rate and pupil dilation, determined by sensors including smart watches and pupil dilation sensing cameras; detection of movements of peripheral devices utilized by the users, such as sensors to determine the speed of typing during the communications and the speed of mouse movements during the communications; and voice analysis for group conversations utilizing vocal communication. In embodiments, the emotions determining module 440 also determines topics under discussion in the conversation channels 415, using, for example, either cognitive analysis of text content or of voice communications being sent through the communication channels 415 as part of the messaging between the user computers 410.

In embodiments, the user emotions and topic determining module 440 continuously provides an output of the identified emotions of the users and the topics under discussion. In alternative embodiments, the user emotions and topic determining module 440 intermittently provides an output of the identified emotions of the users and the topics under discussion, for example, at regularly spaced times, or at random times At step 550, the emotions tagging and summarizing module 470 receives outputs from the user emotions and topic determining module 440 and the normal conversation determining module 450 to tag and label emotions and summarize the emotions and topics in the first time period used to determine the normal conversation velocity. In other words, in embodiments, the emotions tagging and summarizing module 470 uses the same first time period that was used by the normal conversation velocity determining module 450 to determine the normal conversation velocity, and summarizes the user emotions received from the user emotions and topic determining module 440 during this same first time period to provide an indication of the concurrent aggregated emotions of all of the users over the first time period used to establish the normal conversation velocity. This provides a basis for determining how aggregated emotions of the users change when conversation velocity changes, and, in particular, increases, as will be discussed below.

At step 560, after a normal conversation velocity has been determined by the normal conversation velocity determining module 450 and the summarized emotions and topics during the same first time period used to establish the normal conversation velocity have been summarized by the emotions tagging and summarizing module 470, the conversation velocity trajectory determining module 430 and the user emotions and topic determining module 440 start a conversation review process of ongoing discussions for a given conversation channel 415 (corresponding to a group conversation that is assigned to that particular channel 415). In embodiments, the conversation review process is carried out substantially continuously. In alternative embodiments, the conversation review process is carried out by the conversation velocity trajectory determining module 430 and the user emotions and topic determining module 440 intermittently and/or on a random intermittent basis.

After the ongoing conversation review process is started in step 560, at step 570 the conversation velocity trajectory determining module 430 and the user emotions and topic determining module 440 continuously monitor the conversations taking place along the conversation channels 415, between the user computers 410. Typically, conversation participants discuss various topics in the group conversation. Also, typically, the velocities of conversation for individual participants vary greatly. As noted above, in embodiments, the normal conversation velocity determining module 450 establishes a sufficiently long first time period for monitoring the conversation velocity determined by the conversation velocity trajectory determining module 430 so that a normal conversation velocity for all users of a given communication general 415 can be established. This takes into account variations over a relatively long first period of time, such as several days or a week or more, to establish the normal conversation velocity for group discussions occurring over the first time period for individual ones of the conversation channels 415 between the user computers 410.

At step 580, the conversation acceleration determining module 460 determines when the conversation velocity of communications, such as posts, between user computers 410 on one or more of the conversation channels 415 exceeds a threshold which is greater than the normal conversation. In embodiments, the conversation acceleration determining module 460 identifies when the trajectory of the average conversation velocity exceeds a predetermined threshold for a predetermined second period of time. The predetermined threshold and the predetermined second period of time are values that are selected by the moderator to indicate that the users are sending an unusually high number of communications substantially exceeding the normal number of communications for a substantial period of time. For example, if the normal velocity of communications has been determined during the first time period to be about 3 posts per minute, the threshold could be set at 20 posts per minute to indicate that an acceleration to a much higher level of conversation velocity has occurred. Since periodic spikes in conversation velocity naturally take place, the second predetermined time period is set to indicate that the substantially higher level of conversation velocity takes place over a sustained period, for example, at least three minutes.

At step 590, the output module 480 provides outputs received from the emotions tagging and summarizing module 470 and the conversation storage 425 to the moderator computer 490 to be used for moderation, including determining the point where the acceleration in conversation velocity began, and the emotions and topics under discussion throughout both the first and second time periods, as well as after the second time period has passed.

FIG. 6 shows an exemplary embodiment of a display to a moderator in accordance with aspects of the invention. More specifically, FIG. 6 shows a display 600 on the moderator's computer 490 which is an example of an outputs provided by the conversation acceleration determination module 460 to the moderator's computer 490 via the emotions summarizing module 470 and the output module 480. In particular, FIG. 6 shows a timeline for conversation velocity of posts 610 (where the communications in the conversations channels 415 are posts between the user computers 410) over time both during a first time period 625 and a second time period 650. During the first time period 625, the conversation velocity of posts 610 is at or close to the normal conversation velocity level 620 determined by the normal conversation velocity determining module 450. During the second time period 650, the conversation acceleration determining module 460 determines that the conversation velocity of posts 610 has accelerated to a point exceeding a conversation velocity threshold 640 for the second period of time. The timeline of the conversation velocity of posts 610 shown in FIG. 6 also shows a third time period 660, following the second time period 650 during which the conversation velocity of posts 610 decreases to the normal conversation velocity level 620. In the example shown in FIG. 6, the display 600 shows only a timeline for a single conversation channel 415. In alternative embodiments, the display 600 shows a plurality of timelines for multiple conversation channels and group discussions being monitored.

In order to generate the display 600 shown in FIG. 6, the conversation acceleration determining module 460 monitors for posts between user computers 410 which are traveling through the conversation channels 415, and then determines when the conversation velocity of posts 610 accelerates to a conversation velocity of posts 610 which exceeds the conversation velocity threshold 640 for a predetermined time period 650. In regard to FIG. 6, the normal conversation velocity determining module 450 establishes a normal conversation velocity level 620 over the predetermined time, and provides this to the moderator computer 490 via the emotions tagging and summarizing module 470 and the output module 480.

The conversation acceleration determining module 460 sets a conversation velocity threshold 640 which is set at a level to detect an acceleration in the conversation velocity of posts 610 to a conversation velocity of posts sufficient to be a possible concern to the moderator of a group conversation. As also shown in FIG. 6, in embodiments, when the conversation velocity of posts 610 exceeds the conversation velocity threshold 640 for a time equal to or greater than a predetermined time period 650, the conversation acceleration determining module 460 provides an output indicating that the conversation velocity of posts 610 has exceeded the predetermined conversation velocity threshold 640 for at least the time period 650.

In embodiments, the display 600 displays data determined that steps 580 and 590 of FIG. 5. For example, as described above, at step 580, the emotions tagging and summarizing module 470 summarizes the emotions and topics discussed during the time period 650 in which the conversation velocity of posts 610 exceeds the conversation velocity threshold 640, and forwards the summary of emotions, as the aggregated emotions of all of the users, and topics discussed during this period 650 to the moderator computer 490 via the output module 480. In embodiments, the display 600 displays these summarized aggregated emotions as emojis 630.

Additionally, as described above with respect to FIG. 5, at step 590, the output module 480 provides outputs to the moderator computer 490 to be used for moderation, including determining the point where the acceleration in conversation velocity began, and the emotions and topics under discussion throughout both the first and second time periods, as well as after the second time period has passed. For example, as shown in FIG. 6, the emojis 630 are much more concentrated during the second time period 650, when the conversation velocity of posts 610 exceeds the conversation velocity threshold 640, than during the first and third time periods 625 and 660 when the conversation velocity of posts 610 is at the normal conversation velocity level 620. The types of emojis indicate the types of different emotions being expressed during the respective time period 625, 650 and 660. In alternative embodiments, the display 600 shows other types of emotions indicators, such as color-coded symbols or graph lines which indicate emotions by line thickness, line color, etc.

As can be appreciated from FIG. 6, the display of the trajectory of conversation velocity of posts 610 makes it possible to determine the time at which the acceleration in the trajectory of conversation velocity began. In embodiments, the output module 480 also provides the stored conversations, which are time stamped, from the conversation storage 425, the moderator computer 490 so that the time at which the acceleration in the trajectory of the conversation velocity began can be correlated with the stored conversations to determine which user, or users, started the acceleration in conversation velocity. Also, in embodiments, the moderator computer 490 receives time stamped indications of the topics under discussion, provided by the output module 480, (which receives this topic information from the user emotions and topic determining module 440 via the emotions tagging and summarizing module 470). Therefore, the moderator and readily determine when the acceleration began, which users precipitated the acceleration, and what topics were under discussion at the time. This allows the moderator to take appropriate action, such as warning a user in negative situations, or encouraging a user in positive situations.

As an example of embodiments of the invention, a moderator is in charge of 12 different chat rooms for an organization hosting the chat rooms for participants from around the globe. The moderator has working hours between 9 AM and 6 PM, Monday through Friday, but is on call to deal with emergencies at all times of the day and night. Given the situation, embodiments of the present invention are quite useful to such a moderator since it permits for continuous monitoring of the chat rooms, which operate all day and all night, seven days per week, and provides for notifications to the moderator during times when the conversation increases markedly to exceed the conversation velocity threshold 640, which can be preset at a desired level by the moderator, for an appropriate time period which the moderator has also set as the second period of time 650 shown in FIG. 6.

Continuing with the example, chat room number 6 currently has 50 participants. During a first time period 625 shown in FIG. 6, the participants are discussing particular topics, and posting at an average pace of three posts per minute, which has been determined to be the normal conversation velocity level 620 for this particular chat room. However, at a point in time (corresponding to an initial point of acceleration 670 shown in FIG. 6), one of the participants makes a remark that triggers an avalanche of reactions from other members in the group, in particular, causing the group to become much more engaged than normal. From this initial point of acceleration 670, the conversation velocity increases dramatically to an average of 60 posts per minute, which exceeds a conversation velocity threshold 640 which the moderator has set at 50 posts per minute. In this particular example, the moderator has set the second period of time 650 to be three minutes, and, when the conversation velocity of posts 610 exceeds the conversation velocity threshold 640 of 50 posts per minute for longer than the second period of time 650 of three minutes, a notification is sent to the moderator advising of the existence of a sustained period of heightened engagement by the participants.

As noted above, FIG. 6 shows an embodiment of a display 600 received by the moderator in the situation. The display 600 shows not only the fact that the conversation velocity of posts 610 exceeds the conversation velocity threshold 640 for the second period of time 650, but also the change in emojis 630 from happy (as indicated by smiley faces) to angry (as indicated by thunderbolts), indicating that the participants are angry. Further, since the display 600 shows the initial point of acceleration 670 which led to this agitated state of engagement, in accordance with embodiments the moderator listens to the recorded conversations, provided by the output module 480 from the conversation storage 425, at the initial point of acceleration 670 to determine which participant or participants caused the initial accelerated reaction, and what the topic under discussion was at that time. In alternative embodiments, the topic under discussion at any point along the conversation velocity of posts 610 can be indicated on the display 600 based on time-stamped information provided to the moderator computer 490 from the users emotions and topic determining module 440 via the emotions tagging and summarizing module 470 and the output module 480. Thus, the moderator is provided with information to determine appropriate actions to take, such as warning the participant or participants who triggered the increase in conversation velocity, for example, to be careful with regard to using certain words, or to suspend one or more participants if necessary.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining, by a computer device, a first conversation velocity of communications through conversation channels over a first period of time for a group discussion between a plurality of users utilizing, respectively, a plurality of user computers;
   determining, by the computer device, that a conversation velocity of the communications has increased to a second conversation velocity of communications which exceeds a predetermined threshold, and has remained above the predetermined threshold for at least a second period of time;
   determining, by the computer device, aggregated emotions of the users during the second period of time; and
   providing, by the computer device, an output to a moderator of the group discussion indicating that the second conversation velocity of the communications has exceeded the predetermined threshold for at least the second period of time, and indicating the aggregated emotions of the users during the second period of time.

2. The method of claim 1, wherein the communications of the first conversation velocity of communications are posts between the users.

3. The method of claim 2, wherein the first conversation velocity of communications is based on posts occurring between the users which are filtered by at least one selected from the group consisting of: time of day; location; and time of year.

4. The method of claim 3, further comprising determining, by the computer device, aggregate group emotions of the users during the first period of time.

5. The method of claim 4, wherein determining the first conversation velocity of communications is performed continuously.

6. The method of claim 4, further comprising determining, by the computer device, a topic of discussion between the users by cognitive analysis of text content occurring during the second period of time.

7. The method of claim 6, wherein the determining the aggregated emotions of the users includes determining both positive and negative emotions.

8. The method of claim 1, wherein the determining of the first conversation velocity of communications and the determining of the aggregated emotions of the users are performed by a backend server connected to the plurality of user computers.

9. The method of claim 1, wherein the moderator is comprised of an automated bot.

10. The method of claim 1, wherein determining the aggregated emotions of the users is performed in real-time.

11. The method of claim 1, wherein the output to the moderator includes a display of emojis used to indicate the aggregated emotions of the users during the second period of time.

12. The method of claim 11, wherein the display includes a timeline indicating the second conversation velocity of communications during at least the second period of time and a portion of the first period of time.

13. A system for collective emotional engagement detection in a group conversation, the system comprising:
   a processor, a computer readable memory, and a computer readable storage medium located in a computer device;
   program instructions to, in response to receiving inputs via a conversation channel, including communications between participants in conversation using user computers, identify a trajectory of measured average conversation velocity of the communications as a normal conversation velocity over a first time period;
   program instructions to identify emotions associated with participants in conversation wherein the identifying is over the first time period;
   program instructions to summarize the emotions identified over the first time period into aggregated emotions of the users during the first time period;
   program instructions to review an ongoing conversation received from the conversation channel during a second time period, after the normal conversation velocity has been established over the first time period;
   program instructions to, in response to a determination of a trajectory of conversation velocity in the second time period exceeding a predetermined threshold, emotions associated with the participants during the second time period into additional aggregated emotions; and
   program instructions to generate an output of the group conversation for use in moderation, including identifying a point of increase in the trajectory of the conversation velocity in the second time period and a summary of the additional aggregated emotions during the second time period,
   wherein all of the program instructions are stored on the computer readable storage medium for execution by the processor via the computer readable memory.

14. The system of claim 13, further comprising program instructions to tag and label the emotions identified over the first time period.

15. The system of claim 13, wherein the communications are posts occurring between the participants which are filtered by at least one selected from the group consisting of: time of day; location; and time of year.

16. The system of claim 15, wherein the output includes a display of emojis used to indicate the emotions associated with the participants in conversation over the first time period.

17. The system of claim 16, wherein the display includes a timeline of the normal conversation velocity of communications.

18. A computer program product, the computer program product comprising a computer readable storage medium having program instructions embodied therewith, the program instructions executable by a computer device to cause the computer device to:
   determine a first conversation velocity of communications through conversation channels over a first period of time for a group discussion between a plurality of users utilizing, respectively, a plurality of user computers;
   determine that the first conversation velocity of communications has increased to a second conversation velocity of communications which exceeds a predetermined threshold, and has remained above the predetermined threshold for at least a second period of time;
   determine aggregated emotions of the users during the second period of time; and
   provide an output to a moderator of the group discussion indicating that the second conversation velocity of communications has exceeded the predetermined threshold for at least the second period of time, and indicating the aggregated emotions of the users during the second period of time, wherein the output indicates when the increase of the first conversation velocity of communications starts, and indicates an identity of one of the users that sent a communication that started the increase of the first conversation velocity.

19. The computer program product of claim 18, wherein communications include posts between the users.

20. The computer program product of claim 19, wherein the posts occurring posts between the users are filtered by at least one selected from the group consisting of: time of day; location; and time of year.

\* \* \* \* \*